May 24, 1960    W. C. McGAUGHEY    2,937,522
ULTRASONIC RAIL WELD SCANNER
Filed Jan. 13, 1958

United States Patent Office 2,937,522
Patented May 24, 1960

2,937,522
ULTRASONIC RAIL WELD SCANNER

William C. McGaughey, Danbury, Conn., assignor to Sperry Products, Inc., Danbury, Conn., a corporation of New York Filed Jan. 13, 1958, Ser. No. 708,524

1 Claim. (Cl. 73—67.7)

This invention relates to the detection of flaws in the welded sections of rails by means of ultrasonic vibrations. Since the flaws which may occur in such welds lie mainly in the plane of the weld it has been proposed to transmit ultrasonic pulses into the rail from the rail ends in order to obtain reflections of such pulses which could be indicated on an oscilloscope screen. This method however required the transmission of pulses through 40 feet of rail with resultant difficulties due to the extreme distance. Therefore it has been proposed to utilize an angle beam pulse transmitter which could send pulses into the rail adjacent the weld. The difficulty with this method lay in the fact that most of the energy of the pulse which is reflected by a weld defect is directed downwardly toward the bottom of the rail and does not return to the point of transmission.

It is therefore one of the principal objects of this invention to provide a method and means for testing welded rail joints for defects which will overcome the foregoing difficulties and will provide a reliable indication of the presence of a defect in the welded section.

It is a further object of the invention to provide means for scanning the full depth of the welded section for defects.

Further objects and advantages of this invention will become apparent in the following detailed description thereof.

In the accompany drawings.

Figure 1:
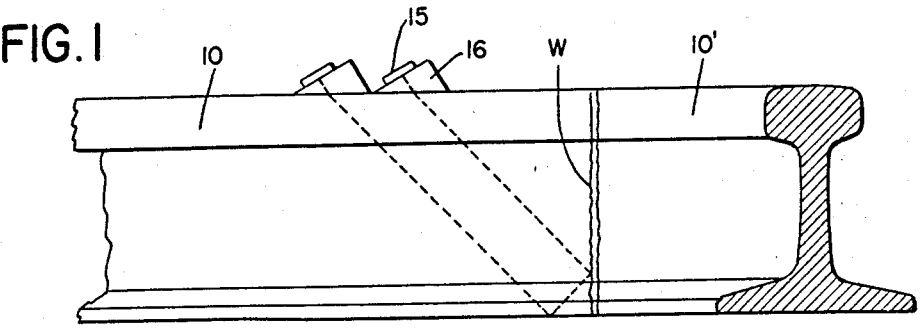
Fig. 1 is a view, largely diagrammatic, of a welded rail section showing one position of the flaw detecting mechanism.

In the drawings I have illustrated my invention as applied to the inspection of the welded section between rail ends. It will, however, be apparent that the invention has broader application to other elongated objects such as pipes, bars and the like, which are welded end to end to provide welded sections substantially at right angles to their principal dimension and which have parallel top and bottom surfaces.

Referring to the drawings, there are shown two rails 10 and 10' welded together end to end to form a welded section W which it is desired to scan for defects. Such scanning may be effected by means of a piezoelectric element 15, which may be a quartz crystal, mounted on a wedge 16 so as to direct ultrasonic pulses into the rail toward the weld. Such pulses may be generated by any suitable high frequency pulse generator connected to crystal 15 which will convert the electric impulses to mechanical impulses. The pulse traveling toward the weld W will be reflected by any defect in the weld, whereas the perfect weld will allow the pulse to pass through. Defects may thus be detected by receiving the reflections from the defective weld sections. The transmitting transducer 15 may also be employed as the receiving transducer but, as stated in the introduction hereto, the reflection of the pulse by a defect is mostly downward toward the base of the rail.

Figure 2:
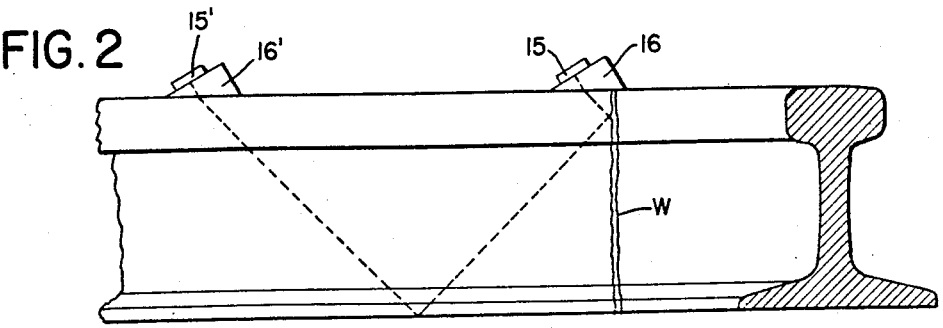
Fig. 2 is a view similar to Fig. 1 showing the detecting mechanism in another position and illustrating the scanning effect of the movement of such mechanism.

By this invention I provide means whereby the energy reflected toward the base of the rail by a weld defect is utilized for indicating the presence of the defect. For this purpose I provide a second wedge 16' having the same angle with respect to the rail tread as the wedge 16 but positioned farther removed from the weld. The wedge 16' carries a second transducer 15' for receiving the reflections from the bottom of the rail. The angular positioning of wedge 16' is the same as that of wedge 16. Referring to Figs. 1 and 2, it will be seen that as the crystal 15 moves continuously closer to the weld it transmits pulses to the weld from bottom to top thereof, whereas in order to receive reflections which the weld transmits to the bottom of the rail it is necessary to move the crystal 15' to the same extent in the opposite direction.

Figure 3:
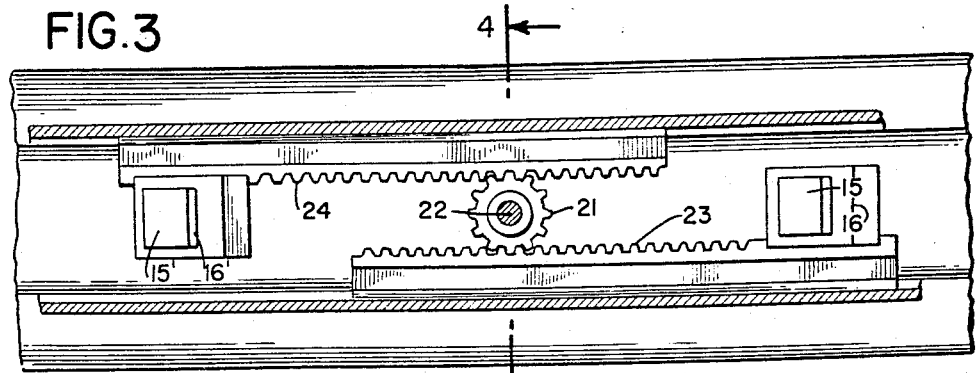
Fig. 3 is a plan view, partly sectioned horizontally, of a mechanism for effecting the movement of the detecting mechanism.
Figure 4:
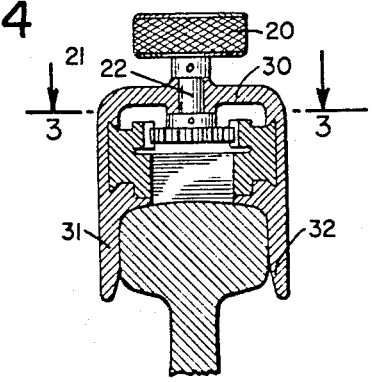
Fig. 4 is a section taken substantially on the line 4—4 of Fig. 3.

A mechanism for effecting such equal and opposite movements of wedges 16 and 16' and their crystals 15 and 15' is disclosed in Figs. 3 and 4. Here it will be seen that as knob 20 is rotated in one direction or the other it will correspondingly rotate a pinion 21 on the same shaft 22 as the knob. The pinion meshes with racks 23 and 24 on opposite sides thereof so as to move the racks equally and oppositely. The racks carry the wedges 16 and 16' and are slidable within a frame 30 having guides 31 and 32 resting upon the rail tread and slidably engaging opposite sides of the rail head to hold the position of the scanning assembly as the search units move along the surface of the rail.

If desired, the crystal 15' may be the transmitter while the crystal 15 is the receiver. The action is the same.

Having described my invention, what I claim and desire to secure by Letters Patent is:

A device for scanning to detect transverse defects such as occur at the interface of flash welds and other sections in objects having parallel top and bottom surfaces such as rails and the like, comprising an electroacoustic transducer cooperating with one surface of said object and angularly positioned for transmitting ultrasonic vibrations into the object through said surface at an angle to normal in a direction toward the weld interface, whereby said vibrations strike the weld interface progressively along the interface as the transducer moves toward the welded section, a second electroacoustic transducer on the same side of the weld as said first transducer and cooperating with the same surface of the object but at a different distance from the weld interface than said first transducer and in the same angular position with respect to normal in the same direction toward the same side of the weld interface as said first transducer for receiving reflections of said vibrations from the weld interface, and means for simultaneously moving said transducers equally and oppositely toward and away from the weld.

References Cited in the file of this patent

UNITED STATES PATENTS

| | | |
|---|---|---|
| 2,799,157 | Pohlman | July 16, 1957 |

FOREIGN PATENTS

| | | |
|---|---|---|
| 683,592 | Great Britain | Dec. 3, 1952 |